(12) United States Patent
Heinrich et al.

(10) Patent No.: US 10,227,874 B2
(45) Date of Patent: Mar. 12, 2019

(54) TOOLING FIXTURE ASSEMBLY FOR PROCESSING A COMPONENT OF A GAS TURBINE ENGINE

(71) Applicant: General Electric Company, Schenectady, NY (US)

(72) Inventors: Todd Gary Heinrich, Cincinnati, OH (US); Brian William Howard, Batavia, OH (US); Jonathan E. Bendel, Middletown, OH (US); Stephen Matthew Mayer, Kettering, OH (US)

( * ) Notice: Subject to any disclaimer, the term of this patent is extended or adjusted under 35 U.S.C. 154(b) by 230 days.

(21) Appl. No.: 15/276,878

(22) Filed: Sep. 27, 2016

(65) Prior Publication Data

US 2018/0087382 A1    Mar. 29, 2018

(51) Int. Cl.
*F01D 5/00* (2006.01)
*B25B 11/02* (2006.01)
(Continued)

(52) U.S. Cl.
CPC ............ *F01D 5/005* (2013.01); *B23Q 3/063* (2013.01); *B23Q 3/084* (2013.01); *B25B 11/02* (2013.01);
(Continued)

(58) Field of Classification Search
CPC ....... B25B 11/02; B25B 5/14; Y10T 29/4981; Y10T 29/37; Y10T 29/49336–29/49339;
(Continued)

(56) References Cited

U.S. PATENT DOCUMENTS 4,192,055 A * 3/1980 Moore .................. B23K 26/26
228/49.1
4,776,822 A * 10/1988 Dougherty ............ H01J 9/2272
29/423
(Continued)

FOREIGN PATENT DOCUMENTS

CN         1688440 A     10/2005
CN       101417396 A      4/2009
(Continued)

OTHER PUBLICATIONS

Machine Translation and First office action and search issued in connection with corresponding CN Application No. 201710889524.4 dated Dec. 27, 2018 (Office action translation not available).

*Primary Examiner* — Matthew P Travers
(74) *Attorney, Agent, or Firm* — General Electric Company; Pamela Kachur

(57) ABSTRACT

A tooling fixture assembly for processing a component of a gas turbine engine is provided. The tooling fixture assembly includes a component nesting fixture for precisely positioning the component within the fixture using a plurality of datum locators. A transfer block is also positioned at a known location and orientation relative to the component and an adhesive is used to fix the relative position of the component and the transfer block. The component and the transfer block are then removed from the component nesting fixture and installed on a machine for drilling, machining, or otherwise processing the component. After the machining is complete, the adhesive may be removed, such that the component may be detached from the transfer block.

19 Claims, 11 Drawing Sheets

(51) Int. Cl.
*B23Q 3/08* (2006.01)
*F01D 25/28* (2006.01)
*B23Q 3/06* (2006.01)

(52) U.S. Cl.
CPC ........ *F01D 25/285* (2013.01); *F05D 2230/12* (2013.01); *F05D 2230/13* (2013.01); *F05D 2230/64* (2013.01); *F05D 2260/202* (2013.01)

(58) Field of Classification Search
CPC ......... Y10T 29/49895; Y10T 29/49998; Y10T 29/53961; Y10T 29/53978; F01D 25/285; F05D 2230/64; F05D 5/005; B23Q 1/03; B23Q 3/063; B23Q 3/084; B23Q 3/18; B23Q 3/186; B23Q 16/00; B23Q 17/002; B23Q 17/22; B23P 15/02; B23P 2700/06
See application file for complete search history.

(56) References Cited

U.S. PATENT DOCUMENTS 5,929,765 A * 7/1999 Urech ................ B23K 37/0408
219/121.31
8,516,676 B2 * 8/2013 High ...................... B23P 15/02
269/268

FOREIGN PATENT DOCUMENTS

| CN | 102528499 A | 7/2012 |
| CN | 102873558 A | 1/2013 |
| CN | 103350358 A | 10/2013 |
| CN | 104191264 A | 12/2014 |
| EP | 2 162 259 B1 | 8/2012 |

* cited by examiner

TOOLING FIXTURE ASSEMBLY FOR PROCESSING A COMPONENT OF A GAS TURBINE ENGINE

FIELD OF THE INVENTION

The present subject matter relates generally to gas turbine engines, and more specifically, to a tooling fixture assembly for use in processing components of gas turbine engines, such as the machining of turbine blades.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Many components of a gas turbine engine must be processed prior to installation in the engine. For example, coatings may need to be applied, inspections may need to be performed, slots may need to be cut, and holes may need to be drilled. For example, a turbine blade may need to have a plurality of holes machined in the blade to allow a flow of cooling air through the blade and over its surface. In addition, used components of gas turbine engines may need to be processed for the purposes of repair or maintenance. Conventional machining processes involve carefully positioning the turbine blade in a nesting fixture such that it contacts six datum locators which extend from six datum locator arms. After the turbine blade is properly positioned, a clamp secures it in place and the fixture is moved to a machine for drilling.

However, the datum locators, datum locator arms, and clamping arm of a conventional nesting fixture often interfere with the machining of the turbine blade or other engine components. More specifically, these features block the line of sight required between the component and the cutting implement, e.g., a drill bit. As a result, the process must be repeated with multiple nesting fixtures having slightly different positioning of the datum locators, datum locator arms, and clamping arms, in order to ensure all holes are machined. Additional nesting fixtures are very expensive and increase the tooling costs significantly. In addition, the process of positioning the turbine blade in the nesting fixture and setting up the machining tool is increased correspondingly with each additional tooling fixture. Therefore, the overall setup and machining time is increased substantially.

Accordingly, a tooling fixture assembly with features for more quickly and efficiently processing a component of a gas turbine engine would be desirable. More specifically, a tooling fixture assembly that enables the machining of turbine blades without the need for using multiple nesting fixtures would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a tooling fixture assembly for processing a component of a gas turbine engine is provided. The tooling fixture assembly includes a component nesting fixture configured for receiving a transfer block and the component of the gas turbine engine. A plurality of datum locators extend from the component nesting fixture and are configured to contact the component at desired locations when the component is in a desired position and orientation within the component nesting fixture. A clamping arm extends from the component nesting fixture, the clamping arm being configured for preventing movement of the component. A transfer block cradle extends from the component nesting fixture, the transfer block cradle configured for receiving the transfer block.

In another exemplary embodiment of the present disclosure, a method for processing a component of a gas turbine engine is provided. The method includes positioning the component in a component nesting fixture at a desired position and orientation and positioning a transfer block in the component nesting fixture at a known location relative to the component. The method further includes fixing the relative position of the component and the transfer block, loading the transfer block and the component on a processing machine, and processing the component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
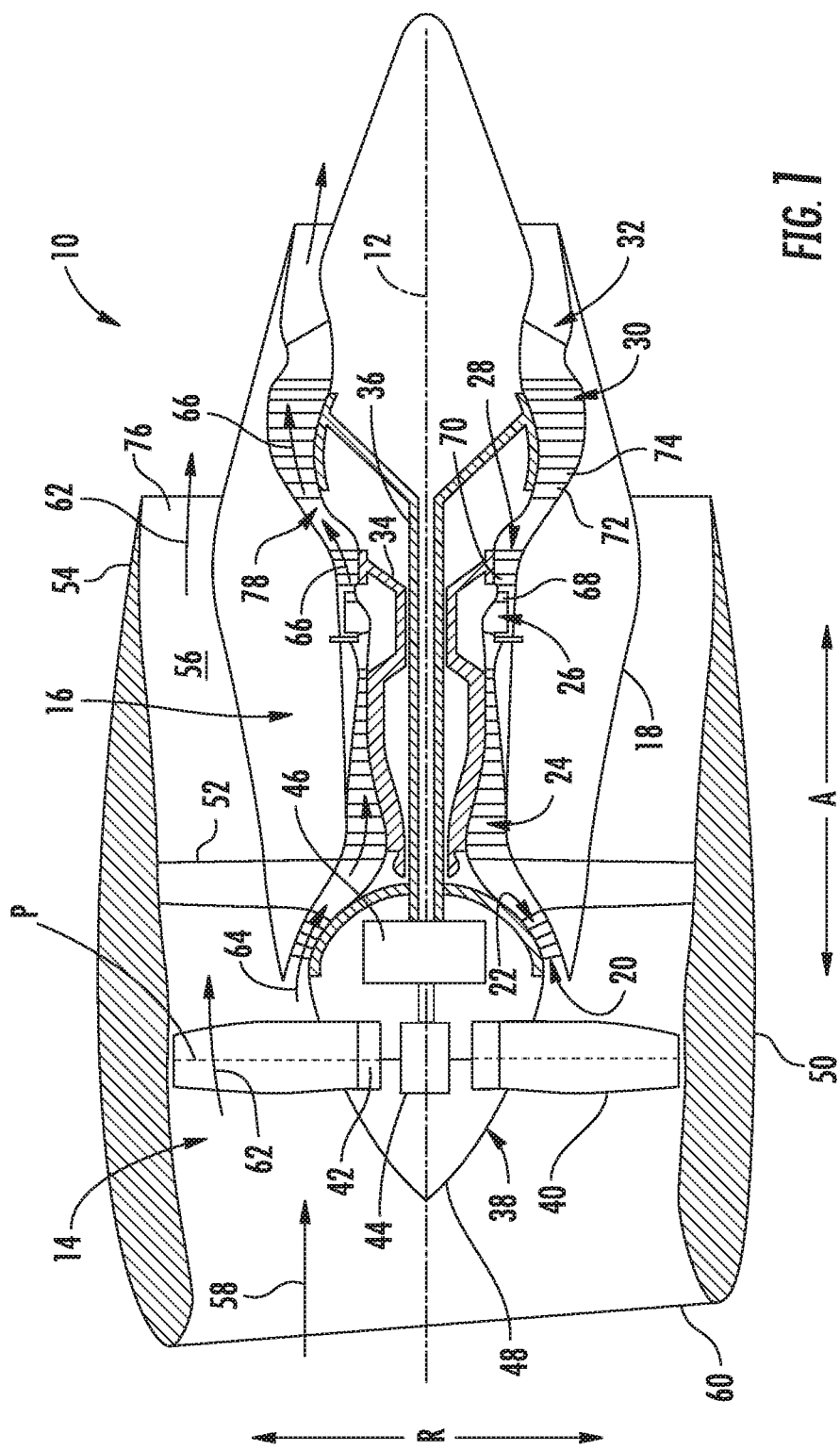
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (not shown) extending about the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 10.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flow path, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
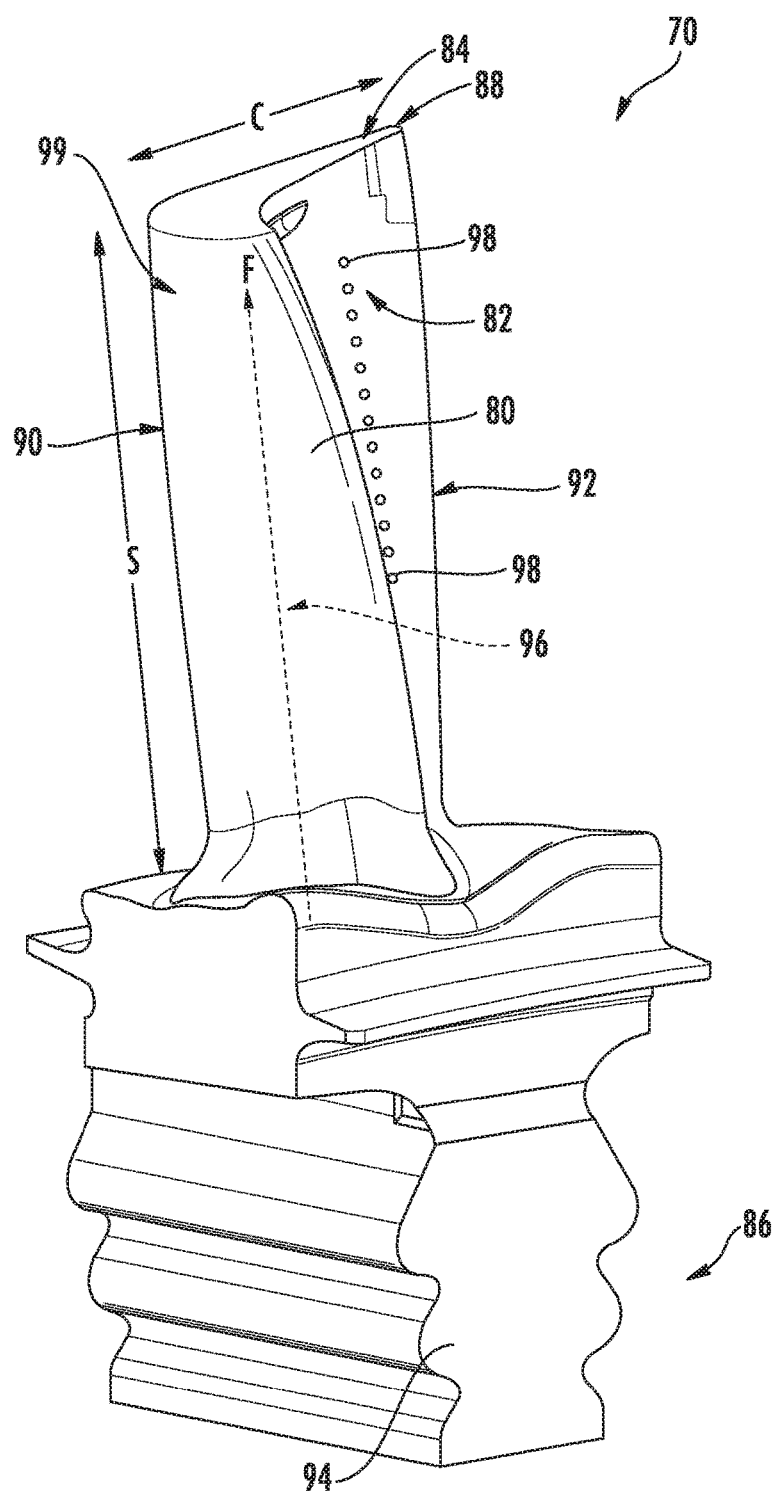
FIG. 2 provides a perspective view of a turbine blade that may be used in the exemplary gas turbine engine of FIG. 1.

Referring to FIG. 2, a perspective view of a turbine blade 70 which may be used with turbofan engine 10 is provided according to an exemplary embodiment of the present subject matter. The systems and methods described below may be used, e.g., for processing turbine blade 70. Although the discussion below refers to the machining of turbine blade 70, it should be appreciated that the systems and methods described may be equally applied to other components of gas turbine engine 10, e.g., a turbine vane, a compressor blade, a fan blade, etc.

Each turbine blade 70 includes an airfoil 80 having a concave pressure side 82 opposite a convex suction side 84. Opposite pressure and suction sides 82, 84 of each airfoil 80 extend radially (i.e., along a radial direction R) along a blade span S from a root 86 to a tip 88. As depicted, root 86 is the radially innermost portion of airfoil 80 and tip 88 is the radially outermost portion of airfoil 80. Moreover, as further shown in FIG. 2, pressure and suction sides 82, 84 of airfoil 80 extend between a leading edge 90 and an opposite trailing edge 92. Leading and trailing edges 90, 92 extend radially from root 86 to tip 88. Moreover, airfoil 80 defines a chord C extending axially between opposite leading and trailing edges 90, 92. Moreover, airfoil 80 defines a width W (not labeled) between pressure side 82 and suction side 84, which may vary along the span S and chord C.

Each turbine blade 70 is coupled to HP shaft or spool 34 via root 86. More particularly, root 86 is coupled to a turbine rotor disk (not shown), which in turn is coupled to shaft or spool 34 (FIG. 1). It will be readily understood that, as is depicted in FIG. 2 and is generally well-known in the art, root 86 may define a projection 94 having a dovetail or other shape for receipt in a complementarily shaped slot in the turbine rotor disk to couple turbine blade 70 to the disk. Of course, each turbine blades 70 may be coupled to the turbine rotor disk and/or HP shaft or spool 34 in other ways as well. In any event, turbine blades 70 are coupled to the turbine rotor disks such that a row of circumferentially adjacent blades 74 extends radially outward from the perimeter of each disk.

In the depicted embodiment, airfoil 80 may generally define a plenum 96. For example, according to one embodiment, pressure and suction sides 82, 84 of airfoil 80 are defined by a first plurality of plies, and a second plurality of plies may define plenum 96 within airfoil 80. Plenum 96 receives a flow of cooling fluid F, e.g., a flow of pressurized air diverted from HP compressor 24. For example, according to an exemplary embodiment, high pressure air from HP compressor 24 may be provided to plenum 96 through a passageway (not shown) defined in root 86 of turbine blade 70.

Still referring to FIG. 2, airfoil 80 may define cooling passages (not shown) within a portion of airfoil 80 for providing the flow of cooling fluid F at trailing edge 92 of airfoil 80. More specifically, the cooling passages place plenum 96 in fluid communication with a plurality of cooling holes 98 defined in airfoil 80 adjacent its trailing edge 92. Although a plurality of axially spaced cooling holes 98 are illustrated, it should be appreciated that any suitable aperture or apertures in fluid communication with plenum 96 may be used according to alternative embodiments.

Accordingly, as illustrated in FIG. 2, cooling passages allow the flow of cooling fluid F from plenum 96 to be directed to an outer surface 99 of airfoil 80, and particularly toward trailing edge 92 of airfoil 80. The fluid flow F received within plenum 96 generally is cooler than the combustion gases flowing against or over outer surface 99 of airfoil 80. Each cooling passage thus forms a continuous pathway in fluid communication with plenum 96 to facilitate flowing cooling fluid F from plenum 96 to outer surface 99 of airfoil 80. As such, the flow of cooling fluid F over outer surface 99 and trailing edge 92 may help reduce the temperatures to which outer surface 99 and trailing edge 92 are exposed.

Figure 3:
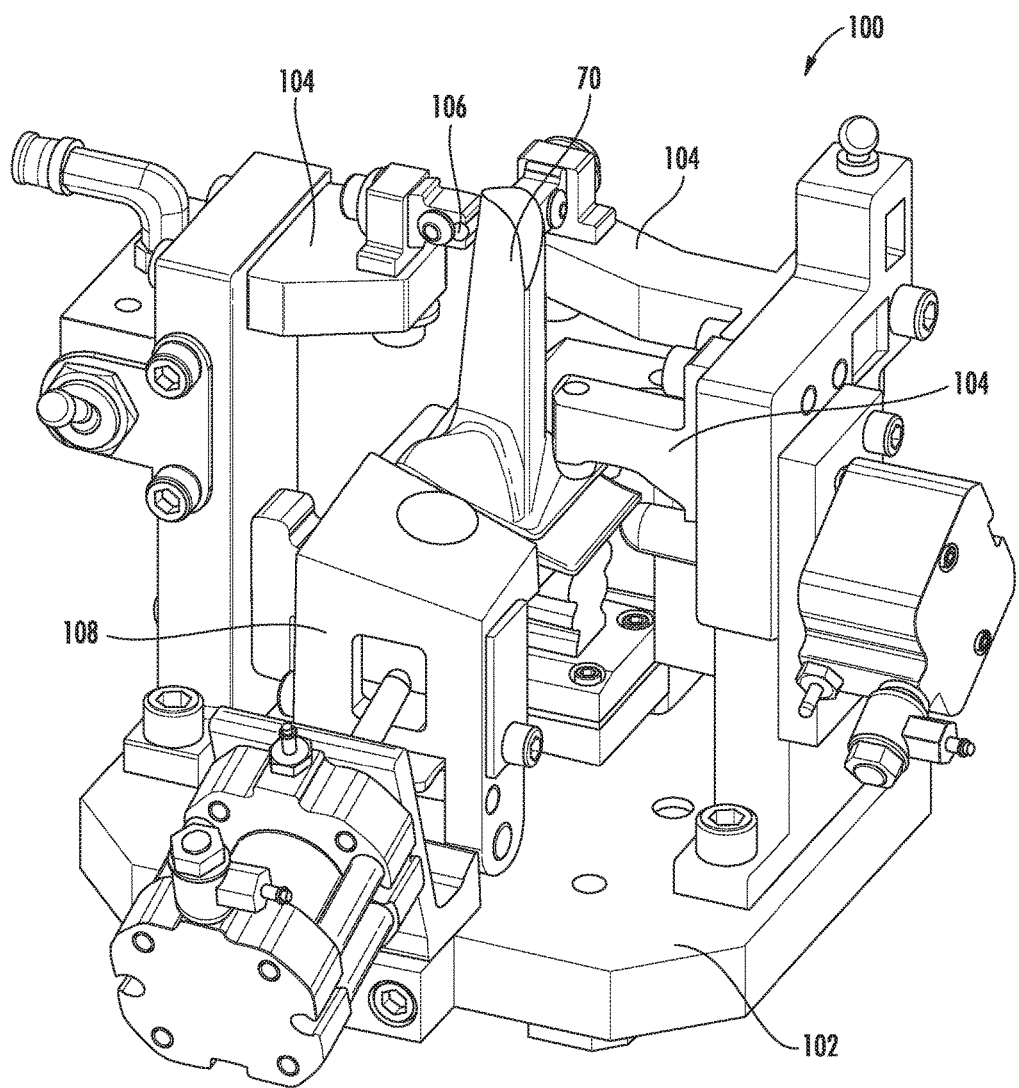
FIG. 3 provides a prior art tooling fixture for machining turbine blades.

As described above, turbine blade 70 may define air plenum 96, a plurality of cooling passageways, a plurality of cooling holes 98, e.g., for providing film cooling of turbine blade 70. Creating cooling holes 98 and other apertures within turbine blades 70 requires that turbine blades 70 be machined, e.g., by removing material using laser machining, electrical discharge machining (EDM), or another suitable material removal method. Referring now to FIG. 3, one such prior art machining fixture 100 for machining such cooling holes 98 in turbine blades 70 will be described.

As shown in FIG. 3, prior art machining fixture 100 includes a base 102 having a plurality of datum locator arms 104 extending from base 102. Each datum locator arm 104 has a datum locator 106 positioned on its end which is positioned at a specific location. The datum locators 106 are intended to contact turbine blade 70 at specific locations to properly position and orient turbine blade 70 relative to base 102.

To properly position turbine blade 70 using prior art machining fixture 100, an operator must position turbine blade 70 such that it contacts each of the plurality of datum locators 106. This requires manipulating turbine blade 70 and sliding shims between turbine blade 70 and the datum locators 106 to ensure turbine blade 70 is actually contacting each of the datum locators 106. For example, an operator may use a very thin shim, e.g., 0.001 inches, to slide in between turbine blade 70 and each datum locator 106, and if the shim passes between the two, further manipulation is required. This process must be repeated until each of the plurality of datum locators 106 simultaneously contacts turbine blade 70. After turbine blade 70 is properly positioned and oriented within prior art machining fixture 100, one or more clamps 108 are used to secure turbine blade 70 within prior art machining fixture 100. Prior art machining fixture 100 and turbine blade 70 are then transferred to a platform of a machining tool.

Notably, however, the machining tool, whether it is a drill, laser, or other material removal machine, requires direct line of sight with the hole or other aperture to be created in turbine blade 70. The various datum locator arms 104 often interfere with access to these holes. As a result, to machine all the necessary holes on a part such as turbine blade 70, multiple machining fixtures must be used. Each fixture has datum locator arms and datum locators positioned at a slightly different location, such that holes that were inaccessible in the previous machining fixture are accessible in a subsequent machining fixture. The process above is repeated for each machining fixture until all the desired holes have been machined. Therefore, using prior art machining fixture 100 to drill cooling holes 98 in turbine blade 70, or to process another component, can be costly and time consuming. In this regard, for example, machining a typical turbine blade 70 requires between five and six different machining fixtures, each of which needs to be separately set up as described above to drill all the needed cooling holes 98.

Referring now generally to FIGS. 4 through 11, an improved tooling fixture assembly 150 and method for using tooling fixture assembly 150 for creating cooling holes 98 and other apertures within turbine blades 70 will be described. Although tooling fixture assembly 150 and the associated method described below refer to machining cooling holes 98 in turbine blade 70, it should be appreciated that aspects of the present subject matter may be applied to any processing of any component of turbofan engine 10. Indeed, concepts disclosed herein may be used for machining any machine component where precise positioning in a machining tool is critical. In addition to being used to process new components of turbofan engine 10 (i.e., an "as manufactured" component), tooling fixture assembly 150 may be used for the processing of used components as well, e.g., for repair and/or maintenance purposes.

Figure 4:
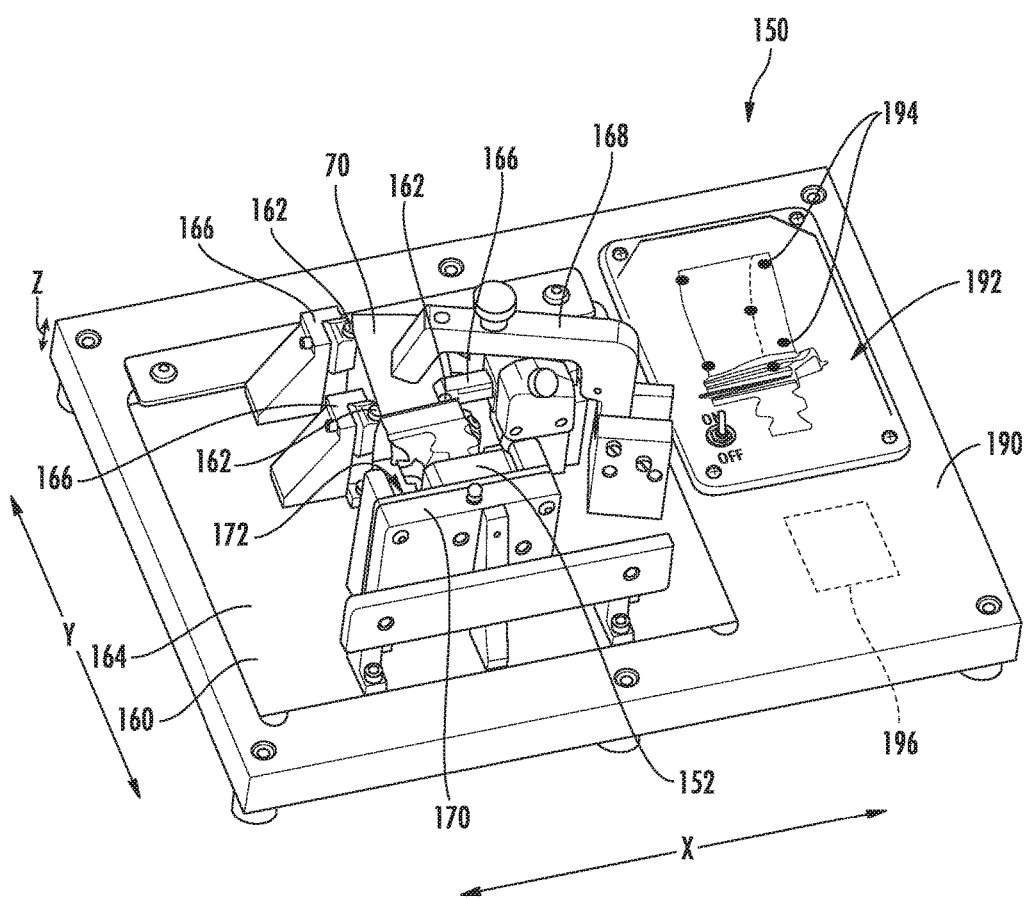
FIG. 4 provides a perspective view of a tooling fixture assembly that may be used for processing the exemplary turbine blade of FIG. 2 according to an exemplary embodiment of the present subject matter.
Figure 5:
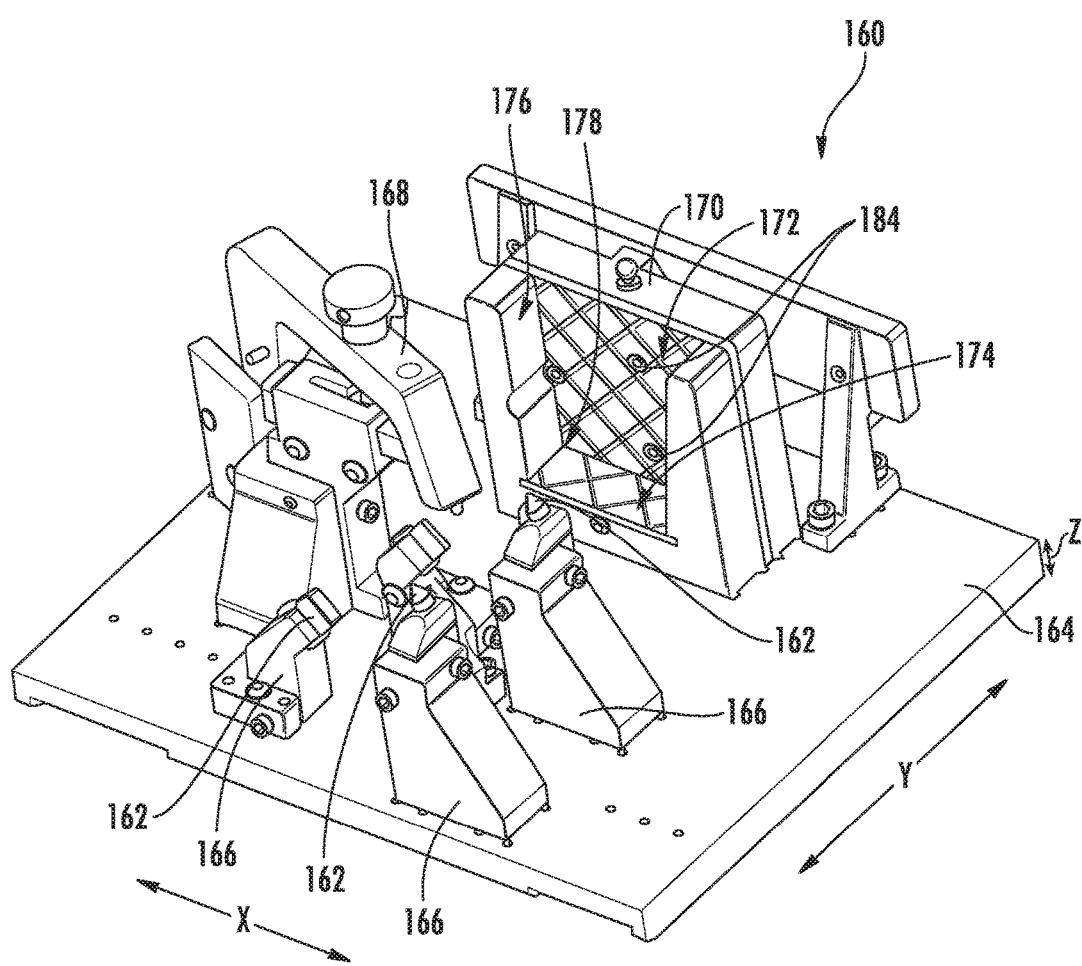
FIG. 5 provides a perspective view of a component nesting fixture that may be used with the exemplary tooling fixture assembly of FIG. 4 according to an exemplary embodiment of the present subject matter.

As shown in FIG. 4, tooling fixture assembly 150 generally defines an X-direction, a Y-direction, and a Z-direction. The X-direction, Y-direction, and Z-direction are mutually perpendicular and form an orthogonal X-Y-Z direction system. As will be described in more detail below, tooling fixture assembly 150 is generally used for selectively positioning and orienting turbine blade 70 relative to a transfer block 152. After the relative positioning is achieved, transfer block 152 and turbine blade 70 are temporarily, but rigidly, fixed together, e.g., using an adhesive, to form a blade-block assembly 154 (see FIG. 9). Blade-block assembly 154 may then be removed from tooling fixture assembly 150 and positioned in a machining tool. More specifically, transfer block 152 is secured in a machining tool (see, e.g., FIG. 10) such that the position and orientation of turbine blade 70 are known. After machining tool machines turbine blade 70 (without interference from datum locator arms), the finished machined turbine blade 70 may be separated from transfer block 152.

According to the illustrated exemplary embodiment, tooling fixture assembly 150 generally includes a component nesting fixture 160 configured for receiving transfer block 152 and turbine blade 70 of turbofan engine 10. As described below, tooling fixture assembly 150 may be used to assist in drilling cooling holes 98 in turbine blade 70. Component nesting fixture 160 generally includes a plurality of datum locators 162 extending from a platform 164 of component nesting fixture 160 and configured to contact turbine blade 70 at desired locations when turbine blade 70 is in a desired position and orientation within component nesting fixture 160. More specifically, datum locator arms 166 extend from platform 164 to position datum locators 162 at specific points within a three-dimensional space defined relative to component nesting fixture 160. Therefore, when turbine blade 70 is placed in component nesting fixture 160, it is not in the proper position and orientation until it is simultaneously contacting all of the datum locators 162.

Component nesting fixture 160 also includes a clamping arm 168 extending from platform 164. Clamping arm 168 is configured for preventing movement of turbine blade 70. In this regard, clamping arm 168 may be moved to contact turbine blade 70 after it is in the desired position. Clamping arm 168 is generally configured for resisting movement, or may otherwise have a tightening mechanism which locks it in position when desired. In this manner, clamping arm 168 prevents further movement of turbine blade 70 once it is in the proper position and orientation.

Component nesting fixture 160 further includes a transfer block cradle 170 extending from platform 164. In this regard, transfer block cradle 170 may be attached to or formed integrally with platform 164. Transfer block cradle 170 is configured for receiving transfer block 152 at a specific, known location relative to component nesting fixture 160. Notably, transfer block 152 needs to be consistently positioned and oriented within component nesting fixture 160 to ensure a proper frame of reference may be maintained between turbine blade 70 and transfer block 152. Such relative positioning is important to ensure turbine blade 70 is properly positioned within the machining fixture and machining tool.

To ensure that transfer block 152 is consistently positioned and oriented relative to component nesting fixture 160, according to the illustrated embodiment, transfer block cradle 170 includes a platform 172 that extends from component nesting fixture 160 along an X-Z plane when installed in tooling fixture assembly 150. As shown in, e.g., FIG. 5, transfer cradle block 170 may further include a back wall 174 and at least one side wall 176. Back wall 174 provides a support surface for transfer block 152 along the Z-direction and side wall 176 provides a support surface for transfer block 152 along the X-direction. In this regard, back wall 174 and side wall 176 define a reference corner 178 which may be used to precisely locate transfer block 152 relative to component nesting fixture 160.

Transfer block 152 is always placed in transfer block cradle 170 such that a corner 180 of transfer block 152 is located in reference corner 178 of transfer block cradle 170 as defined by back wall 174 and side wall 176. Notably, this process of "corner locating" transfer block 152 within transfer block cradle 170 ensures repeatability and accuracy in the positioning of transfer block 152. For example, corner locating of transfer block 152 may be beneficial because wear to transfer block 152 may become common and locating a corner 180 in reference corner 178 always places turbine blade 70 at a fixed and known distance from back wall 174 and side wall 176 on transfer block 152, regardless of how much of transfer block 152 has worn down. Transfer block 152 is then placed in the machine mounting fixture (see discussion regarding FIG. 9 below) and is located using the same corner 180.

To assist in ensuring transfer block 152 is always mounted at reference corner 178 of transfer block cradle 170, tooling fixture assembly 150 may further include a biasing member. For example, the biasing member may be configured for urging transfer block 152 toward reference corner 178 of transfer block cradle 170. According to the illustrated embodiment, the biasing member may include magnets mounted in transfer block 152 and in transfer block cradle 170 in a manner that urges transfer block 152 toward reference corner 178. More specifically, according to the illustrated exemplary embodiment of FIG. 8, transfer block 152 may include two block magnets 182 and transfer block cradle 170 may have two cradle magnets 184. Cradle magnets 184 may be centered closer to back wall 174 and closer to side wall 176 than the corresponding block magnets 182. In this manner, because magnets naturally attract to their centerlines, the offset cradle magnets 184 always ensure that transfer block 152 is magnetically drawn into reference corner 178. It should be appreciated, however, that according to alternative embodiments, the biasing member may be a set of shims, a set screw, a set of springs, or any other suitable mechanism for urging transfer block 152 into reference corner 178.

Figure 9:
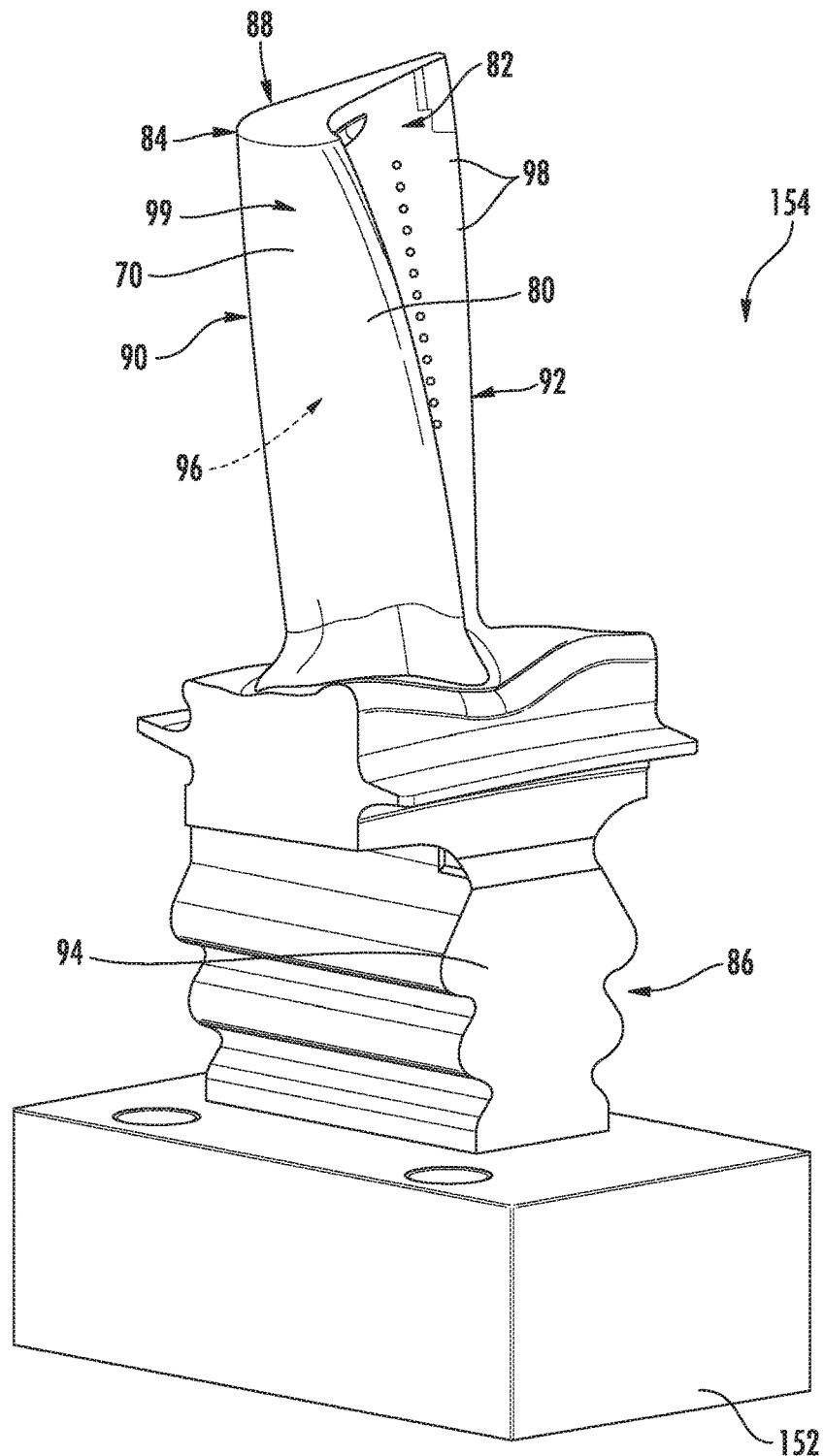
FIG. 9 provides a perspective view of the exemplary turbine blade of FIG. 2, after being machined and before being detached from the transfer block.

In this manner, because the position and orientation of transfer block 152 and turbine blade 70 relative to component nesting fixture 160 are both known, they can be fixed together to form blade-block assembly 154, as best illustrated in FIG. 9. Blade-block assembly 154 may then be mounted in any suitable processing machine to process turbine blade 70. However, in contrast to prior art machining fixture 100, blade-block assembly 154 may be positioned in, e.g., a drilling machine, such that transfer block 152 holds turbine blade 70 in a cantilevered manner into the working area of the tool. Therefore, the working implement of the machining tool, e.g., a drill bit, may have unimpeded access to all surfaces of turbine blade 70.

Referring again to the illustrated exemplary embodiment of FIG. 4, tooling fixture assembly 150 may further include an indicator docking station. For example, according to the illustrated embodiment, the indicator docking station is an LED docking station 190. LED docking station 190 is configured for temporarily receiving component nesting fixture 160 and providing a visual indication to the operator as to which of the six datum locators 162 are contacting their respective points on turbine blade 70. For example, LED docking station 190 may have a graphical display 192 providing a schematic representation of turbine blade 70 and six indicators 194, each indicator being associated with a corresponding datum locator 162.

Each indicator may be a light emitting diode (LED) 194, and may illuminate to provide an indication to the operator that the corresponding datum locator 162 is contacting turbine blade 70. Alternatively, each LED indicator 194 may be red upon activation of LED docking station 190, and may turn green when a corresponding datum locator 162 contacts turbine blade 70. It should be appreciated that LED indicators 194 are only one example of an indicator that may be used to provide a user with a notification that a specific datum locator 162 is contacting turbine blade 70. According to alternative embodiments, alternative lighting elements may be used, or audible or tactile indications may otherwise be provided.

To achieve illumination of LED indicators 194, electrical connections may be established when an operator places component nesting fixture 160 into LED docking station 190 which creates a separate continuity circuit for each of the plurality of datum locators 162. For example, according to an exemplary embodiment, an electrical connection element, e.g., clamping arm 168, may be connected to a control board 196 and may be configured for providing a small electrical charge to turbine blade 70. In addition, each of datum locators 162 may be electrically connected to control board 196. Although clamping arm 168 is described herein as functioning as the electrical connection element, it should be appreciated that the continuity circuits may be established though other connections according to alternative embodiments. For example, one of the plurality of datum locators 190 may provide the electrical charge or a dedicated electrical connection may be made to turbine blade 70.

Figure 6:
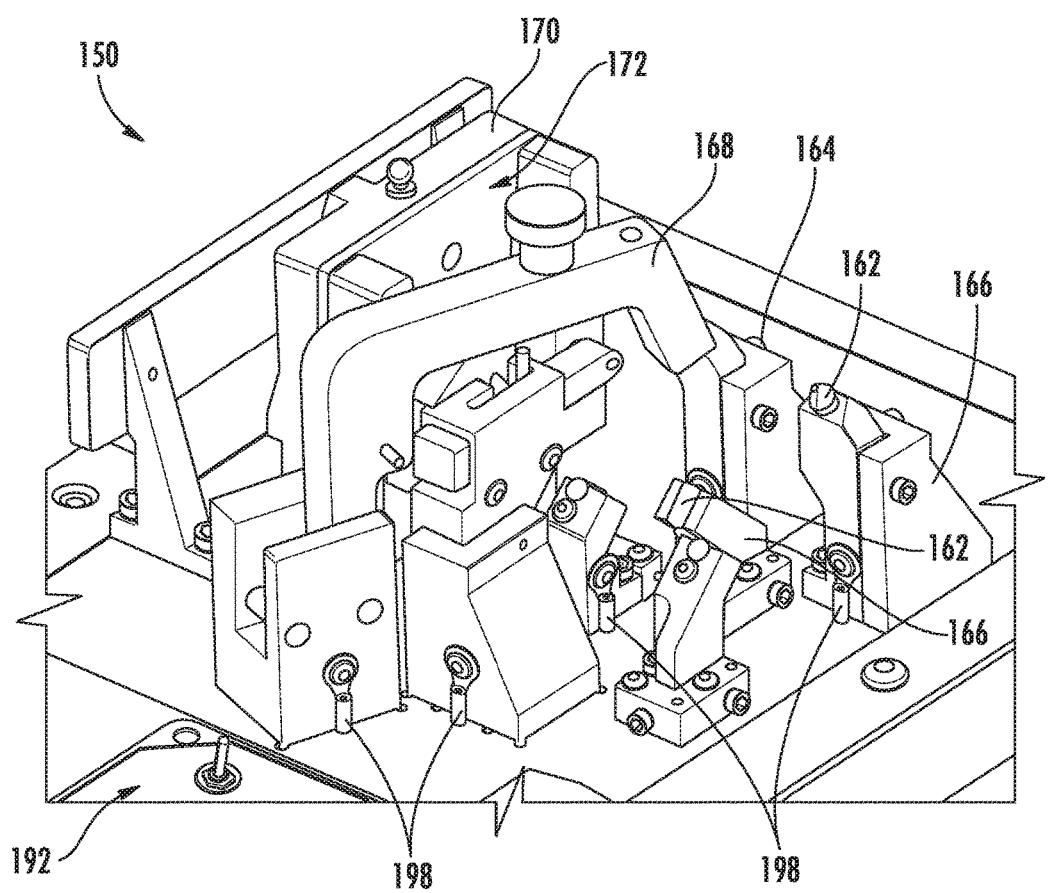
FIG. 6 provides another perspective view of the exemplary tooling fixture assembly of FIG. 4.
Figure 7:
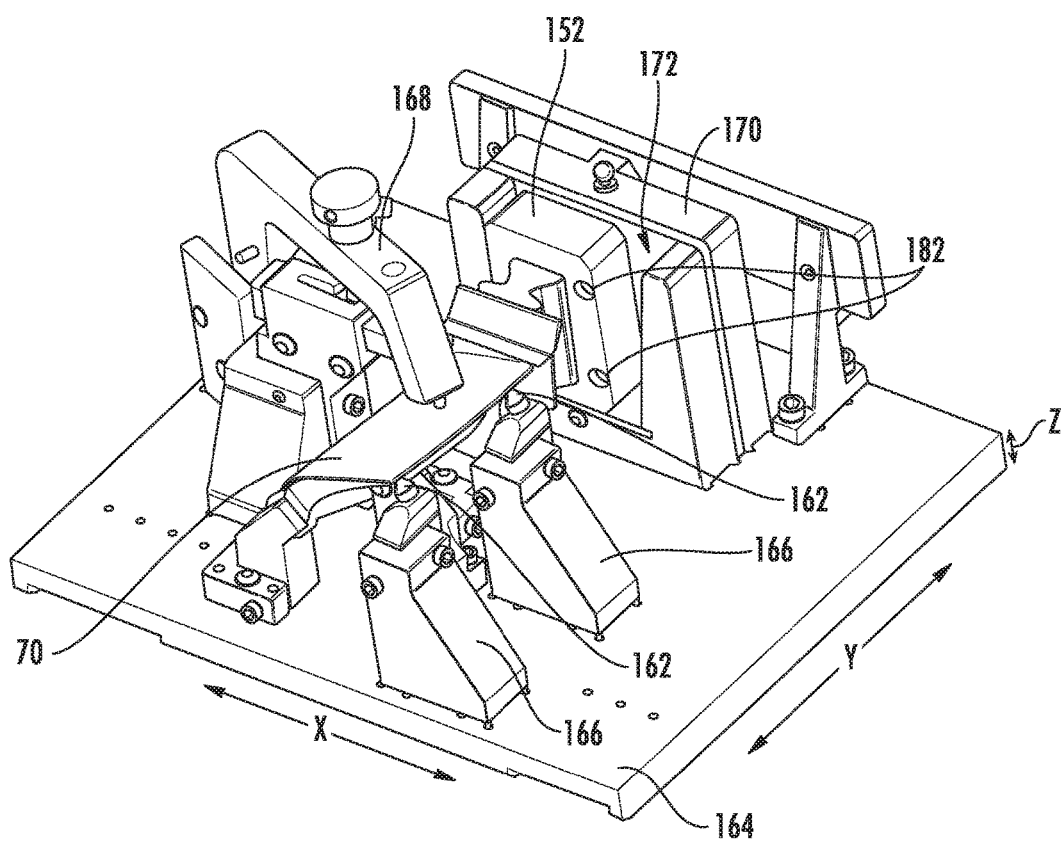
FIG. 7 provides another perspective view of the exemplary component nesting fixture of FIG. 5.
Figure 8:
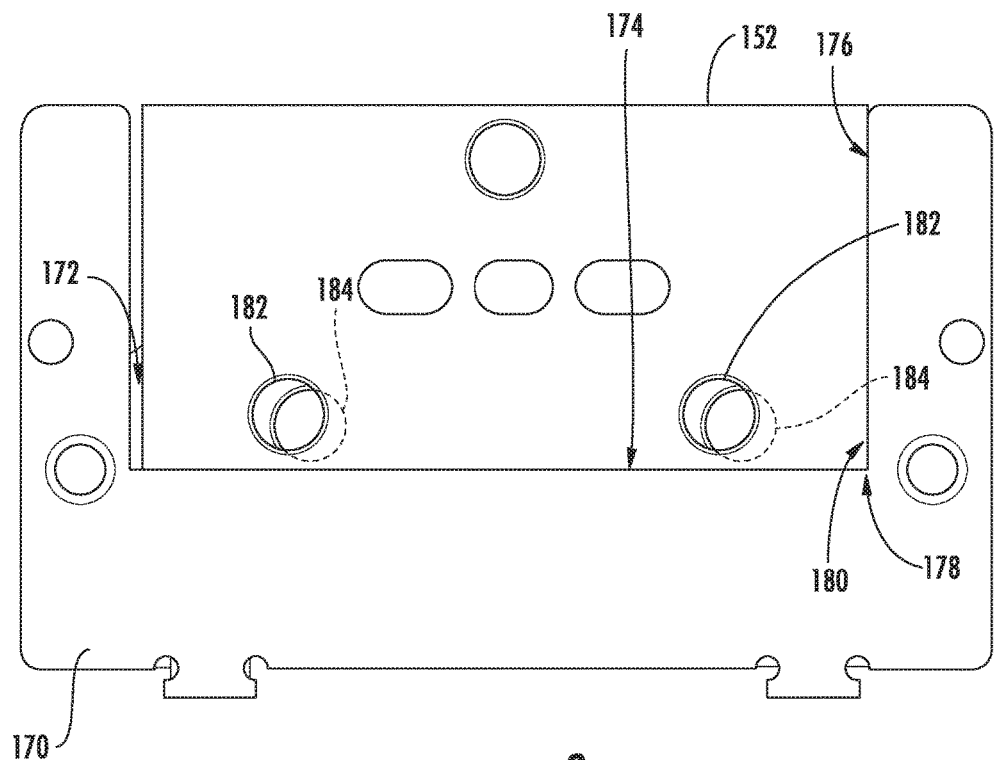
FIG. 8 provides a top view of a transfer block seated in a transfer block cradle of the exemplary component nesting fixture of FIG. 5 according to an exemplary embodiment of the present subject matter.

As best illustrated in FIG. 6, these electrical connections, both to clamping arm 168 and datum locators 162, may be established through the use of electrical leads 198. Electrical leads 198 may be operably coupled to control board 196 of LED docking station 190. Therefore, when a particular datum locator 162 contacts turbine blade 70, a small current is transferred from clamping arm 168, through turbine blade 70, and back to control board 196 via that particular datum locator 162. Control board 196 may then illuminate the LED indicator 194 corresponding to that particular datum locator 162. An operator may continue to manipulate turbine blade 70 until all LED indicators 194 are illuminated, thus indicating that turbine blade 70 is properly positioned and oriented.

As described above, control board 196 may be used to provide an indication, e.g., through the plurality of LED indicators 194, when each of the plurality of datum locators 162 is contacting turbine blade 70. More specifically, in some embodiments, a controller (not shown) may be mounted to control board 196 to control the operation of tooling fixture assembly 150, e.g., to control the illumination of LED indicators 194. The controller may include one or more discrete processors, memory devices, and power storage units (not pictured). The processor may also include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally comprise memory element(s) including, but not limited to, computer readable medium (e.g., random access memory (RAM)), computer readable non-volatile medium (e.g., a NVRAM, flash memory, EEPROM, or FRAM), a compact disc-read only memory (CD-ROM), a magneto-optical disk (MOD), a digital versatile disc (DVD), and/or other suitable memory elements. The memory can store information accessible by the processor(s), including instructions that can be executed by the processor(s). For example, the instructions can be software or any set of instructions that, when executed by the processor(s), cause the processor(s) to perform operations. Optionally, the instructions may include a software package configured to operate tooling fixture assembly 150, e.g., to power the continuity circuits and illuminate LED indicators 194.

After transfer block 152 has been properly positioned in reference corner 178 of transfer block cradle 170 and turbine blade 70 has been properly positioned, oriented, and clamped using datum locators 162 and clamping arm 168, a small gap (not shown) may be present between transfer block 152 and turbine blade 70. The gap enables manipulation of turbine blade 70 into the proper orientation without interference from transfer block 152. However, in order to fix the relative position between turbine blade 70 and transfer block 152, an adhesive (not shown) may be provided between transfer block 152 and turbine blade 70. According to an exemplary embodiment, the adhesive is applied around a perimeter of root 86 of turbine blade 70 adjacent transfer block 152. The adhesive may also fill at least a portion of the gap present between transfer block 152 and turbine blade 70.

Any suitable adhesive may be used to fix the relative position of transfer block 152 and turbine blade 70. According to one exemplary embodiment, the adhesive is an ultraviolet (UV) adhesive that is hardened using UV light. For example, the UV adhesive is injected about the perimeter of root 86 of turbine blade 70 adjacent transfer block 152. Then, component nesting fixture 160 is passed through a UV oven or otherwise exposed to UV light. When the UV adhesive is exposed to UV light, it hardens and forms a rigid bond that prevents relative movement between transfer block 152 and turbine blade 70. In this manner, after the adhesive is cured, transfer block 152 and turbine blade 70 may be removed from component nesting fixture 160 while maintaining their relative positioning. It should be appreciated, however, that in other embodiments, transfer block 152 may be fixed to turbine blade 70 in any other suitable manner, such as by using one or more mechanical fasteners or clamps.

Figure 10:
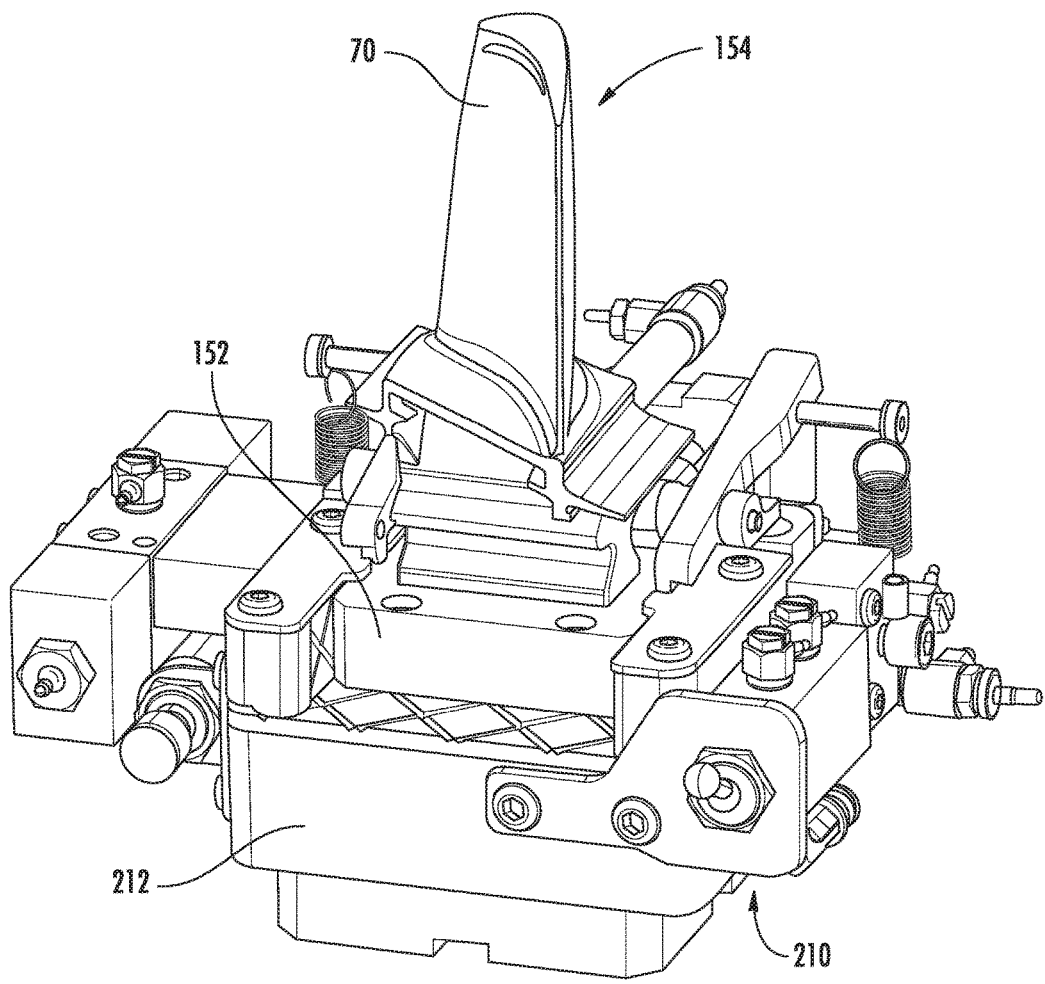
FIG. 10 provides a machining fixture for processing a component of a gas turbine engine, such as the exemplary turbine blade of FIG. 2, according to an exemplary embodiment of the present subject matter.

Once turbine blade 70 and transfer block 152 are rigidly fixed together, the resulting blade-block assembly 154 may be placed in a variety of processing or machining tools to process or machine turbine blade 70. For example, to drill cooling holes 98 in turbine blade 70, transfer block 152 may be mounted in a drilling machine fixture, such as a drilling machine fixture 210 as illustrated in FIG. 10. Notably drilling machine fixture 210 has a tooling cradle 212 that is similar to transfer block cradle 170 of component nesting fixture 160. In this manner, transfer block 152 may be positioned in tooling cradle 212 such that the position and orientation of turbine blade 70 are known. Moreover, tooling cradle 212 may have a plurality of magnets and may rely on corner positioning in the same manner as described above. In this regard, by mounting transfer block 152 in a machining tool using the precise corner discussed above, the machining tool may know the precise position of the turbine blade 70, and may precisely machine it while it is attached to transfer block 152.

Once blade-block assembly 154 is mounted into the machining tool, e.g., the drilling machine, cooling holes 98 may be drilled in turbine blade 70 without interference from datum locator arms 162 or clamping arms 168. In this regard, turbine blade 70 is cantilevered from transfer block 152 and a drill experiences no interference in drilling any surface of airfoil 80 at any angle. Therefore, the need to reposition turbine blade 70 in multiple nest fixtures and set up the machining tool multiple times is eliminated. In this manner, multiple machining fixtures and additional machine setup time can be eliminated, resulting in lower costs and quicker manufacturing time.

Notably, the adhesive used to fix turbine blade 70 to transfer block 152 is also removable. In this regard, for example, UV adhesive may be heated after turbine blade 70 has been machined. As the UV adhesive is heated, it softens such that the turbine blade 70 may be separated from transfer block 152. The residual adhesive may be removed from turbine blade 70, which is now ready to be installed in turbofan engine 10. Similarly, the residual adhesive may be removed from transfer block 152, such that transfer block 152 may be used in a similar manner to machine the next turbine blade 70.

Figure 11:
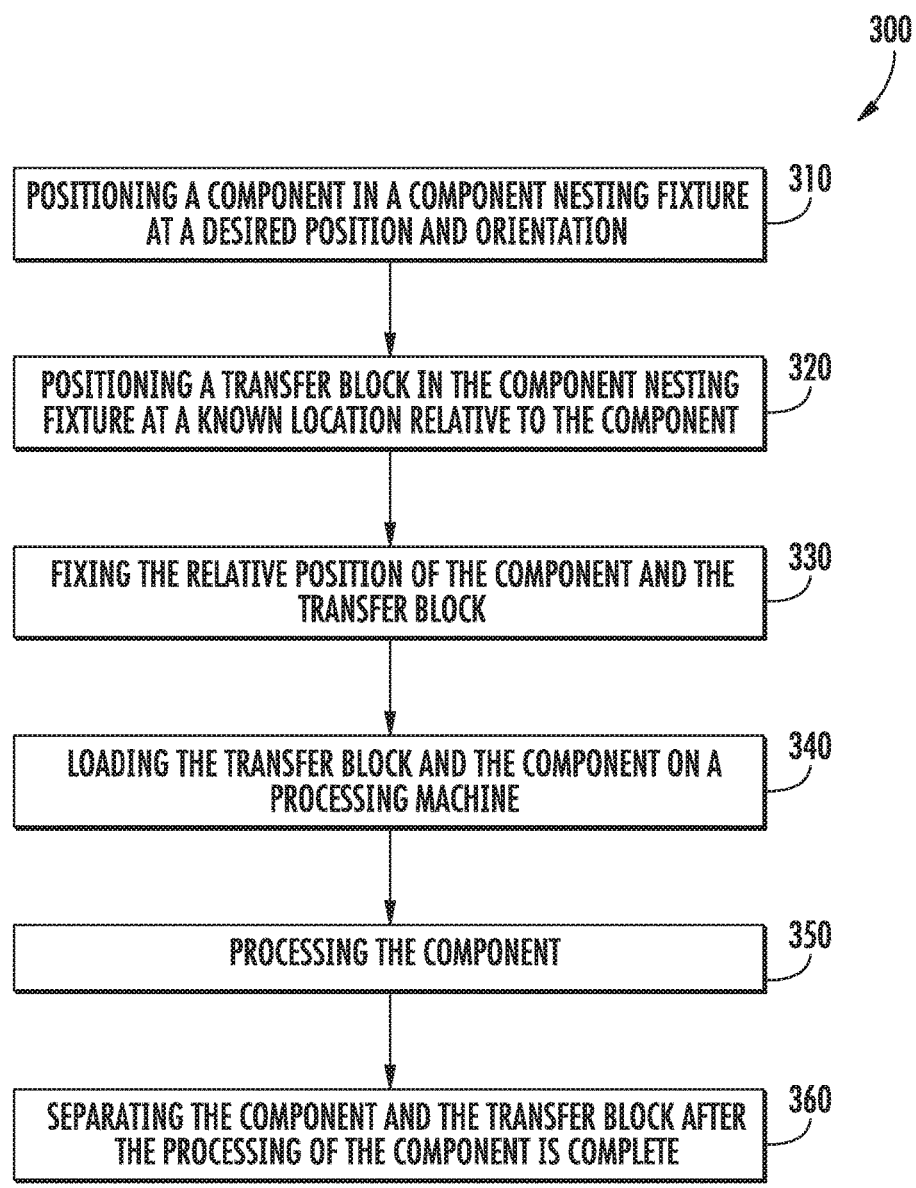
FIG. 11 provides a method for processing a component of a gas turbine engine, such as the exemplary turbine blade of FIG. 2, according to an exemplary embodiment of the present subject matter.

Now that the construction and configuration of tooling fixture assembly 150 according to an exemplary embodiment of the present subject matter has been presented, an exemplary method 300 of processing a component of a gas turbine engine will be described with respect to FIG. 11. It should be understood that method 300 may be used to manufacture, process, or otherwise machine turbine blade 70 or other components of turbofan engine 10.

Method 300 includes, at step 310 positioning a component in a component nesting fixture at a desired position and orientation. As explained above, proper positioning and orientation of the component may be achieved using a plurality of datum locators that extend from the component nesting fixture. Once the component is contacting all of the plurality of datum locators simultaneously, the component is in the proper position and orientation.

As explained above, method 300 may further include placing the component nesting fixture in an LED docking station comprising a plurality of LED indicators associated with respective ones of the plurality of datum locators. In this manner each of the plurality of LED indicators may be illuminated when the respective one of the plurality of datum locators is contacting the component. After all LED indicators are illuminated, a clamping arm may be used to secure the component within the component nesting fixture.

As step 320, method 300 includes positioning a transfer block in the component nesting fixture at a known location relative to the component. For example, the transfer block may be positioned in a transfer block cradle which is also positioned at a known location relative to the datum locators. In this manner, by positioning the component and the transfer block in the component nesting fixture, the relative positioning of the two is known. According to an exemplary embodiment, the transfer block may be positioned in the transfer block cradle such that a corner of the transfer block is received in a corner of the transfer block cradle. Offset magnets in the transfer block and the transfer block cradle may be used to ensure the transfer block always fits precisely in the corner of the transfer block cradle, as discussed above.

After positioning the transfer block and the component in the component nesting fixture at 320, method 300 includes at 330 fixing the relative positions of these components. For example, as described above, an adhesive may be used to create a rigid bond between the transfer block and the component. According to an exemplary embodiment, the adhesive is a UV adhesive cured and hardened by a UV light or a UV oven. After the adhesive is hardened, the transfer block is rigidly fixed relative to the component.

At step 340, method 300 includes removing the rigidly fixed transfer block and component from the component nesting fixture, loading the resulting part on a processing machine, and processing the component at step 350. The type of machine and the corresponding processing may include, e.g., laser machining, electrical discharge machining (EDM), or any other suitable material removal method. After the component has been machined, at step 360, the adhesive may be removed, thereby separating the machined component and allowing for reuse of the transfer block.

Although the description above refers to a system and method of machining cooling holes in turbine blades 70, it should be appreciated that aspects of the present subject matter may be used for machining other components of turbofan engine 10, such as turbine stator vanes, compressor blades, fan blades, or other engine components. In addition, the system may be used to perform other processing of components, such as applying coatings, painting, or otherwise processing. Moreover, the system may be used both for machining new components as well as for repairing or maintaining used components. Indeed, the system and method described herein may be used to machine or otherwise process any component of any product or machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tooling fixture assembly for processing a component of a gas turbine engine, the tooling fixture assembly comprising:
    a component nesting fixture configured for receiving the component of the gas turbine engine;
    a plurality of datum locators extending from the component nesting fixture and configured to contact the component at desired locations;
    a clamping arm extending from the component nesting fixture;
    a transfer block;
    a transfer block cradle attached to or formed integrally with the component nesting fixture, the transfer block cradle configured for receiving the transfer block and positioning the transfer block proximate the component when the component is received within the component nesting fixture and;
    an indicator docking station, the indicator docking station configured for receiving the component nesting fixture and establishing connections with one or more of the plurality of datum locators, the indicator docking station further comprising one or more indicators associated with respective ones of the plurality of datum locators, the one or more indicators configured for providing an indication when the respective one of the plurality of datum locators is contacting the component.

2. The tooling fixture assembly of claim 1, further comprising a biasing member, the biasing member being configured for urging the transfer block toward a corner of the transfer block cradle.

3. The tooling fixture assembly of claim 1, wherein an electrical connection member is configured to provide an electrical charge to the component when the electrical connection member contacts the component, thereby driving current from the electrical connection member, through the component, to the plurality of datum locators that are contacting the component.

4. The tooling fixture assembly of claim 1, wherein the plurality of datum locators comprises six datum locators.

5. The tooling fixture assembly of claim 1, wherein when each of the plurality of datum locators is contacting the component, a gap is defined between the component and the transfer block.

6. The tooling fixture assembly of claim 1, further comprising an adhesive for joining the component and the transfer block.

7. The tooling fixture assembly of claim 6, wherein the adhesive is an ultraviolet (UV) adhesive that is hardened using a UV light.

8. The tooling fixture assembly of claim 1, wherein the component is a turbine blade.

9. A method for processing a component of a gas turbine engine using the tooling fixture assembly of claim 1, the method comprising:
    positioning the component in the component nesting fixture at a desired position and orientation;
    positioning the transfer block in the component nesting fixture at a known location relative to the component;
    fixing the component to the transfer block;
    loading the transfer block and the component on a processing machine; and
    processing the component.

10. The method of claim 9, wherein the step of positioning the component comprises positioning the component such that the component contacts each of the plurality of datum locators extending from the component nesting fixture.

11. The method of claim 10, wherein the component nesting fixture is received in an indicator docking station comprising a plurality of indicators associated with respective ones of the plurality of datum locators, and wherein the method further comprises illuminating each of the plurality of indicators when the respective ones of the plurality of datum locators is contacting the component.

12. The method of claim 9, wherein the step of positioning the transfer block comprises positioning the transfer block within the transfer block cradle.

13. The method of claim 12, wherein the transfer block cradle further comprises a biasing member, the biasing member being configured for urging the transfer block toward a corner of the transfer block cradle.

14. The method of claim 9, further comprising securing the component within the component nesting fixture using the clamping arm.

15. The method of claim 9, wherein the step of fixing the relative position of the component and the transfer block comprises applying an ultraviolet (UV) adhesive and hardening the UV adhesive with UV light.

16. The method of claim 9, further comprising:
    separating the component and the transfer block after the processing of the component is complete.

17. The method of claim 9, wherein the step of processing the component comprises electrical discharge machining (EDM) or laser machining the component.

18. The method of claim 9, wherein the component is an as manufactured component.

19. The method of claim 9, wherein the component is a used component, and wherein the step of processing the component comprises repairing the component.

* * * * *